Patented Oct. 21, 1930

1,779,176

UNITED STATES PATENT OFFICE

BERNARD LONG, OF PARIS, FRANCE, ASSIGNOR TO SOCIETE ANONYME DES MANUFACTURES DES GLACES & PRODUITS CHIMIQUES DE SAINT-GOBAIN, OF PARIS, FRANCE

ULTRA-VIOLET-TRANSMITTING GLASS AND PROCESS OF MAKING THE SAME

No Drawing. Application filed May 24, 1928, Serial No. 280,391, and in France June 4, 1927.

This invention relates to a glass having a high transmission for the short waves of sunlight (ultra-violet) and a high stability for such transmission even under prolonged exposure to such rays, and to a process of manufacturing the same.

It is essential for ultra violet transmission that the iron content be reduced to very low limit. Iron cannot be convenienty eliminated entirely, and therefore it has been proposed to melt such glass under a reducing condition, so that such iron as may be in the glass will be in a ferrous condition. Under the action of the short waves, however, such ferrous iron is apparently converted into ferric iron with the loss of the desired transparency.

I have found that this change in the condition of the iron may be retarded by introducing into the glass batch a small percentage of manganese dioxide. When the glass is melted under reducing conditions, the manganese is reduced to a sub-oxide. By exposure of the glass to sunlight, this sub-oxide is attacked by any oxygen in the glass and converted to the dioxide before the ferrous iron is converted into ferric iron. While, due to the small quantity of iron present the resultant glass may have a violet tint after the reoxidation of the manganese, the transmission of the glass for the ultra-violet will not be affected.

In carrying out my invention I melt quartz, or a glass batch of the desired ingredient, freed as far as may be desired from iron and containing 0.05% to 0.50% of dioxide manganese, under reducing conditions, produced either by regulation of the furnace, or by the addition of carbonaceous material to the batch and form the resultant glass into sheets or other desired forms with as small exposure to oxidizing conditions as may be. To obtain good ultra-violet transmission the glass should have a ferric iron content of less than 0.02%.

The glass having this limited quantity of ferric iron and the ultra-violet transmission referred to is not to be confounded with the usual window glasses containing substantial quantities of iron, which are generally melted under oxidizing conditions and to the batch of which manganese is added to neutralize the yellow tint which would otherwise be initially present due to ferric iron. With the ultra-violet transmission glasses no addition of manganese is needed for neutralizing such initial yellow tint.

Having thus described my invention what I claim is:—

1. A glass transparent to and stable against the action of ultra-violet rays of sunlight, containing less than 0.02% of ferric iron and containing manganese in quantities between 0.05% and 0.50%.

2. The hereinbefore described method of fabricating a glass transparent to and stable against the action of ultra-violet rays of sunlight, comprising so melting such proper raw materials containing 0.05% to 0.50% manganese dioxide, under reducing conditions that the resultant glass contains ferric iron less than 0.02%.

In testimony whereof I hereunto affix my signature.

BERNARD LONG.